US012781352B2

(12) United States Patent
Kuroda et al.

(10) Patent No.: US 12,781,352 B2
(45) Date of Patent: Nov. 3, 2026

(54) SUBSTRATE SURFACE TREATMENT DEVICE AND SUBSTRATE SURFACE TREATMENT METHOD

(71) Applicants: Keiji Kuroda, Toyota (JP); Hiroshi Yanagimoto, Toyota (JP); Rentaro Mori, Toyota (JP); Kohsei Gotoh, Tokyo (JP); Takahiro Hiramatsu, Tokyo (JP); Hiroyuki Orita, Tokyo (JP)

(72) Inventors: Keiji Kuroda, Toyota (JP); Hiroshi Yanagimoto, Miyoshi (JP); Rentaro Mori, Kasugai (JP); Kohsei Gotoh, Nishinomiya (JP); Takahiro Hiramatsu, Nishinomiya (JP); Hiroyuki Orita, Kobe (JP)

(73) Assignees: TOYOTA JIDOSHA KABUSHIKI KAISHA, Toyota (JP); TMEIC CORPORATION, Tokyo (JP)

( * ) Notice: Subject to any disclaimer, the term of this patent is extended or adjusted under 35 U.S.C. 154(b) by 57 days.

(21) Appl. No.: 18/830,712

(22) Filed: Sep. 11, 2024

(65) Prior Publication Data

US 2025/0101599 A1 Mar. 27, 2025

(30) Foreign Application Priority Data

Sep. 21, 2023 (JP) ................................ 2023-155495

(51) Int. Cl.
*C23G 3/00* (2006.01)
*B05B 14/20* (2018.01)
(Continued)

(52) U.S. Cl.
CPC ................ *C23G 3/00* (2013.01); *B05B 14/20* (2018.02); *B08B 3/022* (2013.01); *C23G 3/023* (2013.01); *C23G 3/025* (2013.01)

(58) Field of Classification Search
CPC ...................................................... B05B 14/20
See application file for complete search history.

(56) References Cited

U.S. PATENT DOCUMENTS

| | | | |
|---|---|---|---|
| 4,736,221 | A | 4/1988 | Shidara |
| 2021/0291222 | A1 | 9/2021 | Nishi |

FOREIGN PATENT DOCUMENTS

| | | | | |
|---|---|---|---|---|
| CN | 106623201 | A | * | 5/2017 |
| CN | 107352501 | A | * | 11/2017 |

(Continued)

*Primary Examiner* — Kaj K Olsen
*Assistant Examiner* — Richard Z. Zhang
(74) *Attorney, Agent, or Firm* — Dickinson Wright, PLLC

(57) ABSTRACT

Provided is a surface treatment device capable of performing surface treatment on a treatment surface of a substrate at low cost by reusing a mist of a treatment liquid introduced into a treatment chamber. The surface treatment device is a device for surface treatment of a substrate by causing a treatment liquid to adhere to the treatment surface of the substrate. The surface treatment device includes a mist generator that generates a mist of the treatment liquid; a treatment chamber that introduces the mist generated by the mist generator and causes the introduced mist to adhere to the treatment surface of the substrate; and a circulation path that circulates the mist discharged from the treatment chamber to the treatment chamber together with the mist generated by the mist generator.

16 Claims, 4 Drawing Sheets

(51) Int. Cl.
*B08B 3/02* (2006.01)
*C23G 3/02* (2006.01)

(56) References Cited

FOREIGN PATENT DOCUMENTS

| | | | | |
|---|---|---|---|---|
| CN | 108885411 | A | * | 11/2018 |
| DE | 3635405 | A1 | | 4/1987 |
| JP | H11329116 | A | | 11/1999 |
| JP | 2007033730 | A | | 2/2007 |
| WO | 2013/077008 | A1 | | 5/2013 |

* cited by examiner

SUBSTRATE SURFACE TREATMENT DEVICE AND SUBSTRATE SURFACE TREATMENT METHOD

CROSS REFERENCE TO RELATED APPLICATIONS

The present application claims priority from Japanese patent application JP 2023-155495 filed on Sep. 21, 2023, the entire content of which is hereby incorporated by reference into this application.

BACKGROUND

Technical Field

The present disclosure relates to a substrate surface treatment device and a substrate surface treatment method.

Background Art

For example, there is proposed a device for surface treatment of a substrate by causing a treatment liquid to adhere to the treatment surface of the substrate. JP 2007-033730 A proposes a surface treatment device including a mist generator that generates a mist of a cleaning liquid as a treatment liquid, and a treatment chamber that introduces the generated mist and causes the introduced mist to adhere to the treatment surface of the substrate. According to the surface treatment device, surface treatment can be performed on the surface of the substrate by causing the generated mist to adhere to the treatment surface of the substrate placed in the treatment chamber.

SUMMARY

However, in the surface treatment device shown in JP 2007-033730 A, a part of the mist introduced into the treatment chamber does not adhere to the substrate, and such a mist may adhere to the wall surface of the treatment chamber or the like and coagulate, and accumulate on the bottom surface of the treatment chamber as a treatment liquid. The treatment liquid accumulated in the treatment chamber is not supposed to be reused, and the treatment liquid is typically discharged.

The present disclosure has been made in view of the foregoing, and provides a surface treatment device and a surface treatment method capable of performing surface treatment on the treatment surface of the substrate at low cost by reusing a mist of a treatment liquid introduced into a treatment chamber.

In view of the foregoing, the surface treatment device according to the present disclosure is a substrate surface treatment device for surface treatment of a substrate by causing a treatment liquid to adhere to a treatment surface of the substrate, comprising: a mist generator configured to generate a mist of the treatment liquid; a treatment chamber configured to introduce the mist generated by the mist generator and cause the introduced mist to adhere to the treatment surface of the substrate; and a circulation path configured to circulate the mist discharged from the treatment chamber to the treatment chamber together with the mist generated by the mist generator.

According to the present disclosure, the mist generated by the mist generator is introduced into the treatment chamber. The introduced mist adheres to the treatment surface of the substrate in the treatment chamber, which allows the surface treatment of the substrate using a treatment liquid. Meanwhile, a part of the mist not adhering to the treatment surface of the substrate is discharged from the treatment chamber, then flows through the circulation path together with the mist generated by the mist generator, and is fed again into the treatment chamber. Consequently, the mist of the treatment liquid introduced into the treatment chamber is reused, and thus it is possible to perform surface treatment on the treatment surface of the substrate at low cost.

In some embodiments, the mist generator is disposed in the circulation path. The mist generator includes a container that collects the treatment liquid derived from the mist from the treatment chamber and stores the treatment liquid. The mist generator generates the mist from the treatment liquid stored in the container.

According to this aspect, the treatment liquid resulting from the coagulation of the mist in the treatment chamber can be collected in the container. Since the mist generator generates again the mist from the collected treatment liquid, the collected treatment liquid can be reused together with the mist discharged from the treatment chamber.

In some embodiments, the circulation path is connected to the treatment chamber such that the mist is introduced into an upper part of the treatment chamber and the mist is discharged from a lower part of the treatment chamber. The container is disposed in a lower part of the circulation path.

According to this aspect, the mist is introduced into the upper part of the treatment chamber and the introduced mist is discharged from the lower part of the treatment chamber. The treatment liquid resulting from the coagulation of the mist in the treatment chamber flows down the wall surface of the treatment chamber, and the treatment liquid flowed down is discharged from the lower part of the treatment chamber. This allows the discharged treatment liquid to flow to the treatment chamber.

In some embodiments, the circulation path is connected to a gas path for a carrier gas that carries the mist to the treatment chamber.

According to this aspect, since the circulation path is connected to the gas path that carries the mist, it is possible to select a type of carrier gas appropriate for the surface treatment of the substrate from the gas path, and introduce the mist into the treatment chamber with the selected carrier gas. Additionally, by adjusting the flow rate of the carrier gas flowing in the gas path, the mist at a desired concentration can be introduced into the treatment chamber.

In some embodiments, the surface treatment device further comprises a conveying device configured to convey the substrate in and out of the treatment chamber with the treatment surface of the substrate directed upward. The circulation path is connected to the treatment chamber such that the mist is introduced into an upper part of the treatment chamber and the mist is discharged from a lower part of the treatment chamber.

According to this aspect, the mist introduced into the upper part of the treatment chamber is allowed to efficiently adhere to the treatment surface of the substrate directed upward. The mist not adhering to the treatment surface is discharged from the lower part of the treatment chamber and is allowed to be circulated together with the generated mist.

In some embodiments, a plurality of treatment units is disposed along a conveying direction of the conveying device, each serving as a unit comprising at least the mist generator, the treatment chamber, and the circulation path.

According to this aspect, the substrate is allowed to sequentially pass through the plurality of treatment units while conveying the substrate by the conveying device, and thus surface treatment can be continuously performed on the treatment surface of the substrate in the plurality of treatment units.

In some embodiments, an air nozzle for draining the treatment liquid derived from the mist adhering to the treatment surface of the substrate is disposed between the adjacent treatment chambers of the treatment units.

According to this aspect, in the treatment unit on the upstream side in the conveying direction among the adjacent treatment units, draining of the treatment liquid (mist) adhering to the treatment surface is performed with the air nozzle. Accordingly, even when surface treatment is performed in the treatment unit on the downstream side in the conveying direction with a treatment liquid (mist) that is different from the treatment liquid on the upstream side, the surface treatment is less likely to be affected by the treatment liquid adhered in the treatment unit on the upstream side.

The present disclosure includes a substrate surface treatment method described below. The substrate surface treatment method according to the present disclosure is a substrate surface treatment method for surface treatment of a substrate by causing a treatment liquid to adhere to a treatment surface of the substrate, comprising: introducing a mist generated from the treatment liquid into a treatment chamber where the substrate is placed; causing the mist to adhere to the treatment surface of the substrate; discharging the mist from the treatment chamber; and circulating the discharged mist to the treatment chamber together with the generated mist.

According to the present disclosure, the mist generated from the treatment liquid is introduced into the treatment chamber, and the introduced mist adheres to the treatment surface of the substrate in the treatment chamber, which allows the surface treatment of the substrate using a treatment liquid. Meanwhile, a part of the mist not adhering to the treatment surface of the substrate is discharged from the treatment chamber, and the discharged mist, together with the generated mist, is circulated to the treatment chamber and can be fed again into the treatment chamber. In this way, the generated mist is circulated to the treatment chamber and reused, and thus it is possible to perform surface treatment on the treatment surface of the substrate at low cost.

In some embodiments, a treatment liquid derived from the mist is collected from the treatment chamber; the mist is generated from the collected treatment liquid; and the discharged mist is circulated to the treatment chamber together with the generated mist.

According to this aspect, since the treatment liquid resulting from the coagulation of the mist in the treatment chamber is collected and the mist is generated again from the collected treatment liquid, the collected treatment liquid can be reused together with the mist discharged from the treatment chamber.

In some embodiments, the mist is introduced into an upper part of the treatment chamber; the mist is discharged from a lower part of the treatment chamber; the treatment liquid flowing down from the treatment chamber is collected; and the mist is generated from the collected treatment liquid.

According to this aspect, the mist is introduced into the upper part of the treatment chamber and the introduced mist is discharged from the lower part of the treatment chamber. The treatment liquid resulting from the coagulation of the mist in the treatment chamber also flows down the wall surface of the treatment chamber and is discharged from the lower part of the treatment chamber. This allows collecting the treatment liquid in a simple way.

In some embodiments, the mist is introduced into the treatment chamber while carrying the mist using a carrier gas.

According to this aspect, it is possible to select a type of carrier gas appropriate for the surface treatment of the substrate in the circulation path and introduce the mist into the treatment chamber with the selected carrier gas. Additionally, by adjusting the flow rate of the carrier gas flowing in the gas path, the mist at a desired concentration can be introduced into the treatment chamber.

In some embodiments, the substrate is conveyed in and out of the treatment chamber with the treatment surface of the substrate directed upward. The mist is introduced into an upper part of the treatment chamber and the mist is discharged from a lower part of the treatment chamber.

According to this aspect, the mist introduced into the upper part of the treatment chamber is allowed to efficiently adhere to the treatment surface of the substrate directed upward. The mist not adhering to the treatment surface is discharged from the lower part of the treatment chamber and is allowed to be circulated together with the generated mist.

In some embodiments, the treatment chamber includes a plurality of treatment chambers disposed along a conveying direction of the substrate, and in each of the plurality of treatment chambers, the mist is caused to adhere to the treatment surface of the substrate.

According to this aspect, the substrate is allowed to sequentially pass through the plurality of treatment chambers while conveying the substrate, and thus surface treatment can be continuously performed on the treatment surface of the substrate in the plurality of treatment chambers.

In some embodiments, draining of a treatment liquid derived from the mist adhering to the treatment surface of the substrate is performed between the adjacent treatment chambers.

According to this aspect, in the treatment chamber on the upstream side in the conveying direction, draining of the treatment liquid (mist) adhering to the treatment surface is performed with the air nozzle. Accordingly, even when surface treatment is performed in the treatment chamber on the downstream side in the conveying direction with a treatment liquid (mist) that is different from the treatment liquid on the upstream side, the surface treatment is less likely to be affected by the treatment liquid adhered in the treatment chamber on the upstream side.

According to the present disclosure, it is possible to perform surface treatment on the treatment surface of the substrate at low cost by reusing a mist of a treatment liquid.

DETAILED DESCRIPTION

Referring to FIG. 1 to FIG. 4, two embodiments of the present disclosure will be described.

First Embodiment

1. Regarding Substrate B and Treatment Liquid L

Figure 1:
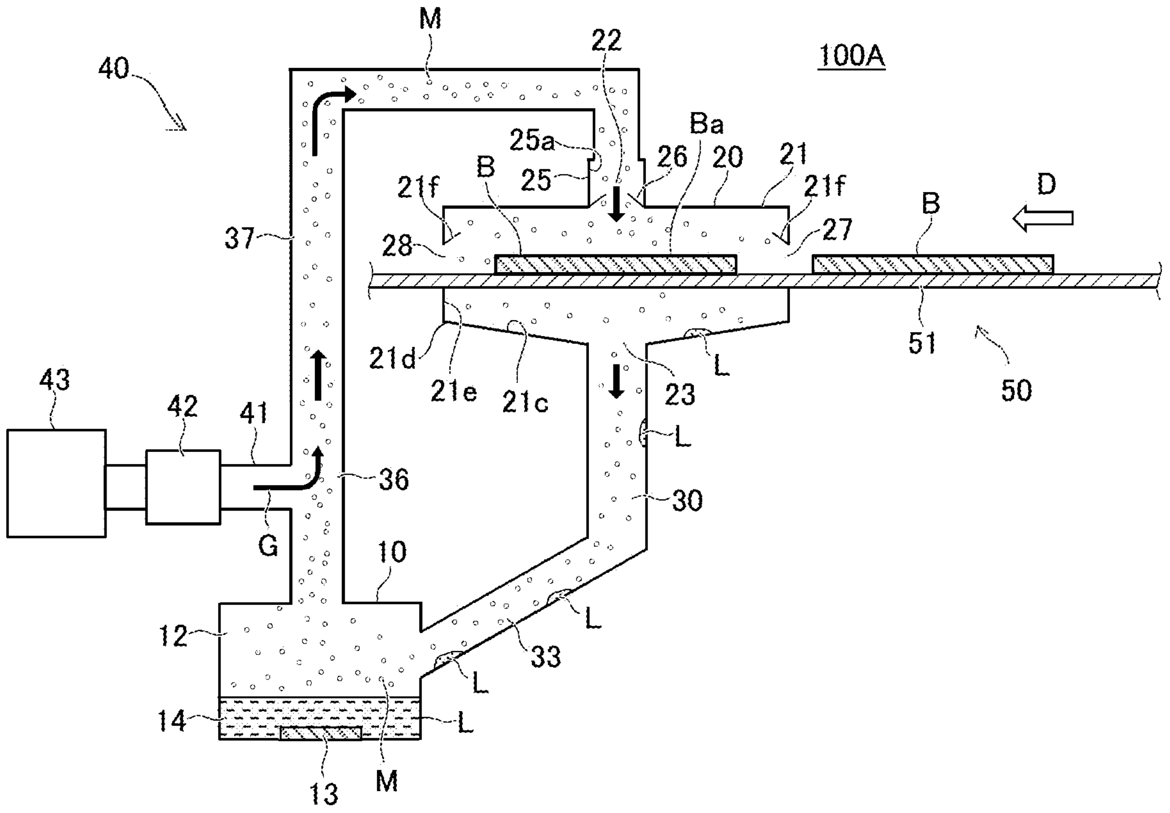
FIG. 1 is a schematic cross-sectional view for describing a substrate surface treatment device according to a first embodiment.

As shown in FIG. 1, a surface treatment device 100A according to the present embodiment is a device for surface treatment of a substrate B using a treatment liquid L. Here, examples of the substrate B may include a substrate made of metal or resin, a substrate coated with a metal film, and the like.

The treatment liquid L adheres to a treatment surface Ba of the substrate B, whereby the surface treatment of the substrate B is performed. The type of treatment liquid L is selected according to the type of surface treatment performed. For example, when the surface treatment is to clean the treatment surface Ba, the treatment liquid L may be water (e.g., pure water). For example, when the surface treatment is to etch the treatment surface Ba of metal, the treatment liquid L may be an acidic or alkaline aqueous solution. When the treatment surface Ba is copper, the treatment liquid L may be a ferric chloride aqueous solution or the like.

For example, when the surface treatment is degreasing treatment on the treatment surface Ba, the treatment liquid L may be a degreasing liquid. Examples of the degreasing liquid may include an alkaline degreasing liquid or an acidic degreasing liquid. Examples of the alkaline degreasing liquid may include a liquid obtained by mixing a surfactant in an alkaline aqueous solution of sodium hydroxide or sodium carbonate or the like. Examples of the acidic degreasing liquid may include a liquid obtained by mixing a surfactant in an acidic aqueous solution of sulfuric acid or hydrochloric acid or the like.

For example, when the surface treatment is activation treatment on the treatment surface Ba of the substrate B for plating, the treatment liquid Lis an activation liquid. Examples of the activation liquid may include an aqueous solution of dilute sulfuric acid or dilute hydrochloric acid or the like, and the activation liquid may be a liquid containing as a primary component an acid of the same component as the plating solution component.

2. Regarding Surface Treatment Device 100A

As shown in FIG. 1, the surface treatment device 100A is a device that causes a mist M (treatment liquid L) to adhere to the treatment surface Ba of the substrate B so as to perform the surface treatment on the treatment surface Ba. The surface treatment device 100A includes a mist generator 10, a treatment chamber 20, a circulation path 30, and a gas supply unit 40. These components will be described in detail below.

2-1. Regarding Mist Generator 10

The mist generator 10 is a device that generates the mist M of the treatment liquid L. In the present embodiment, the mist generator 10 is disposed in the circulation path 30, which will be described later. The mist generator 10 includes a container 14 that collects the treatment liquid L derived from the mist M from the treatment chamber 20 (described later), and stores the treatment liquid L.

The container 14 is disposed in the lower part of the circulation path 30, and a space 12 formed above the container 14 forms part of the circulation path 30. In the present embodiment, the mist generator 10 is an ultrasonic-type mist generator, and an ultrasonic generator (ultrasonic element) 13 that applies ultrasound to the treatment liquid L is disposed in the bottom part of the container 14.

When the treatment liquid L is a solution (etching liquid, degreasing liquid, or activation liquid) other than water, an ultrasound-type mist generator or a spray-type mist generator may be used. This allows the mist M to contain a component dissolved in the solution. Meanwhile, when the treatment liquid L is water, a thermal mist generator that heats the treatment liquid L may be used other than the above-mentioned types of mist generator.

In the present embodiment, the mist generator 10 may adjust the particle size of the mist M within the range of 10 to 80 μm. It is difficult to generate a mist M having a particle size smaller than 10 μm. In contrast, the mist M having a particle size greater than 80 μm may coagulate at a high concentration of the mist M, and is less likely to suspend in a carrier gas G.

Note that in the present embodiment, when the mist generator 10 is of the ultrasound-type, adjusting the frequency and amplitude of the ultrasound applied to the treatment liquid L allows adjusting the particle size of the mist M generated from the treatment liquid L. When the mist generator 10 is of the spray-type, adjusting the pore size of the spray nozzle allows adjusting the particle size of the mist M generated from the treatment liquid L. The particle size of the mist M may be measured by laser diffraction, for example.

2-2. Regarding Treatment Chamber 20

The treatment chamber 20 is a member that introduces the mist M generated by the mist generator 10 and causes the introduced mist M to adhere to the treatment surface Ba of the substrate B. The mist M is introduced into the upper part of the treatment chamber 20 and the introduced mist M is discharged from the lower part of the treatment chamber 20. The treatment chamber 20 includes a body 21 in and out of which the substrate B is conveyed and where the surface treatment is performed on the treatment surface Ba of the substrate B, and a mist containing chamber 25 that is formed on the body 21 and allows the body 21 to contain the mist M.

The body 21 has an inlet 27 through which the substrate B placed on a conveyor belt 51 is conveyed and an outlet 28 through which the substrate B placed on the conveyor belt 51 is conveyed. A plate 21*f*, which extends upward toward the inside of the body 21 and prevents the treatment liquid L from dripping, is attached to the upper side of the inlet 27 and the outlet 28. The mist containing chamber 25 is provided on the body 21. The body 21 and the mist containing chamber 25 are partitioned by a partition plate 26 that prevents the treatment liquid L from dripping, and the partition plate 26 has a rectangular introduction port 22 through which the mist M from the mist containing chamber 25 is introduced into the body 21.

The introduction port 22 is connected to the circulation path 30 via the mist containing chamber 25 storing the mist M. Specifically, a supply pipe 37 of the circulation path 30 is connected to the upper part of the mist containing chamber 25, and the mist M released from the supply pipe 37 is stored in the mist containing chamber 25, and then supplied to the inside of the body 21 via the introduction port 22.

The partition plate 26 forms a bottom wall of the mist containing chamber 25, and the partition plate 26 has, at its center, the above-described introduction port 22. The introduction port 22 has a width W1, which is wider than the width WB of the substrate B. This allows the mist M to uniformly adhere to the treatment surface Ba of the substrate B conveyed in the body 21. The term "width" as used herein means a length along the horizontal direction orthogonal to a conveying direction D of the substrate B.

The partition plate 26 is inclined downward from the introduction port 22 toward the peripheral edge 26*b* of the partition plate 26. With this configuration, the mist M adhering to the inner wall surface 25*a* of the mist containing chamber 25 and to the inclined surface 26*a* of the partition plate 26 coagulates, and even after it becomes the treatment liquid L and flows down, the treatment liquid L can be accumulated in the space formed by the inclined surface 26*a* of the partition plate 26 and the inner wall surface 25*a*. Consequently, it is possible to prevent the treatment liquid L from dripping on the substrate B inside of the body 21. Note that a water discharge unit that discharges the treatment liquid L accumulated in this space may be provided, such that the discharged treatment liquid L flows into and collected in the container 14.

A discharge port 23 for discharging the mist M from the treatment chamber 20 is formed in the lower part of the body 21. In the present embodiment, the discharge port 23 is rectangular. However, its shape is not limited thereto, and may be a slit, for example. The discharge port 23 is formed at the center of a bottom wall surface 21*c* of the body 21. The bottom wall surface 21*c* is inclined downward from the peripheral edge 21*d* of the bottom wall surface 21*c*. This allows the treatment liquid L adhering to the inner wall surface 21*e* and bottom wall surface 21*c* of the body 21 to flow toward the discharge port 23.

2-3. Regarding Circulation Path 30

The circulation path 30 is a path for discharging the mist M from the treatment chamber 20 and for circulating the discharged mist M to the treatment chamber 20 together with the mist M generated by the mist generator 10. Specifically, the circulation path 30 is connected to the treatment chamber 20 such that the mist M is introduced into the upper part of the treatment chamber 20 and the mist M is discharged from the lower part of the treatment chamber 20. The container 14 of the mist generator 10 is disposed in the lower part of the circulation path 30.

The circulation path 30 has a discharge pipe 33 and a supply pipe 37. The discharge pipe 33 connects the discharge port 23 of the treatment chamber 20 and the mist generator 10, and extends downward from the discharge port 23. Note that, as shown in FIG. 1, the discharge pipe 33 may partially be inclined downward toward the mist generator 10.

As described above, with the discharge pipe 33 extending downward from the discharge port 23, the mist M discharged from the treatment chamber 20 is allowed to stably flow to the container 14 of the mist generator 10. Additionally, the treatment liquid L resulting from the mist M coagulated in the treatment chamber 20 is also allowed to flow to the container 14 through the discharge pipe 33. Consequently, the mist generator 10 can collect, in the container 14, the treatment liquid L derived from the mist M from the treatment chamber 20, and generate the mist M from the treatment liquid L stored in the container 14.

The supply pipe 37 rises up from the mist generator 10 and connects the mist generator 10 and the treatment chamber 20. The supply pipe 37 includes a meeting portion 36, which is connected to a gas path 41 for the carrier gas G that carries the mist M to the treatment chamber 20. The mist M and the carrier gas G merge at the meeting portion 36, and then the mist M is carried to the mist containing chamber 25 of the treatment chamber 20.

Note that a check valve (not illustrated) is provided between the meeting portion 36 and the mist generator 10 to prevent the carrier gas G from flowing (i.e., prevent the backflow of the carrier gas G) from the meeting portion 36 to the mist generator 10. Note that instead of the check valve, a backflow preventing throttle or the like may be provided between the meeting portion 36 and the mist generator 10.

2-4. Regarding Gas Supply Unit 40

The gas supply unit 40 includes a gas supply source 43, a flow regulating valve 42, and a gas path 41. The gas supply source 43 is a supply source from which the carrier gas G that carries the mist M is supplied. For example, when the carrier gas G is atmosphere (air), the gas supply source 43 serves as a compressor that takes in the atmosphere, and compresses and releases it, for example. When the carrier gas G is an inert gas such as nitrogen gas, argon gas, or the like, the gas supply source 43 serves as a tank or a cylinder filled with the inert gas. The flow regulating valve 42 regulates the flow rate of the carrier gas G released from the gas supply source 43, and the carrier gas G flows through the gas path 41 to the meeting portion 36 of the supply pipe 37.

2-5. Regarding Conveying Device 50

The conveying device 50 is a so-called a belt conveyor, and includes a conveyor belt 51 that conveys the substrate B placed thereon, and a drive unit (not illustrated) that moves the conveyor belt 51 in a predetermined direction. FIG. 1 simply illustrates the conveyor belt 51. Though not illustrated, the conveyor belt 51 is wound in a loop over a pair of sprockets on the opposite sides with the treatment chamber 20 interposed therebetween. Additionally, to one of the sprockets, a motor that rotates the sprockets and drives the conveyor belt 51 in the conveying direction is attached. The pair of sprockets and the motor correspond to the above-mentioned drive unit.

The conveyor belt 51 is inserted through the treatment chamber 20 via the inlet 27 and the outlet 28 of the body 21. The conveyor belt 51 is moved along the horizontal direction by the drive unit such that the substrate B placed on the conveyor belt 51 is conveyed into the treatment chamber 20 via the inlet 27 with the treatment surface Ba facing up, and the substrate B conveyed in the treatment chamber 20 is then conveyed out of the treatment chamber 20 via the outlet 28.

3. Regarding Surface Treatment Method for Substrate B

Figure 2:
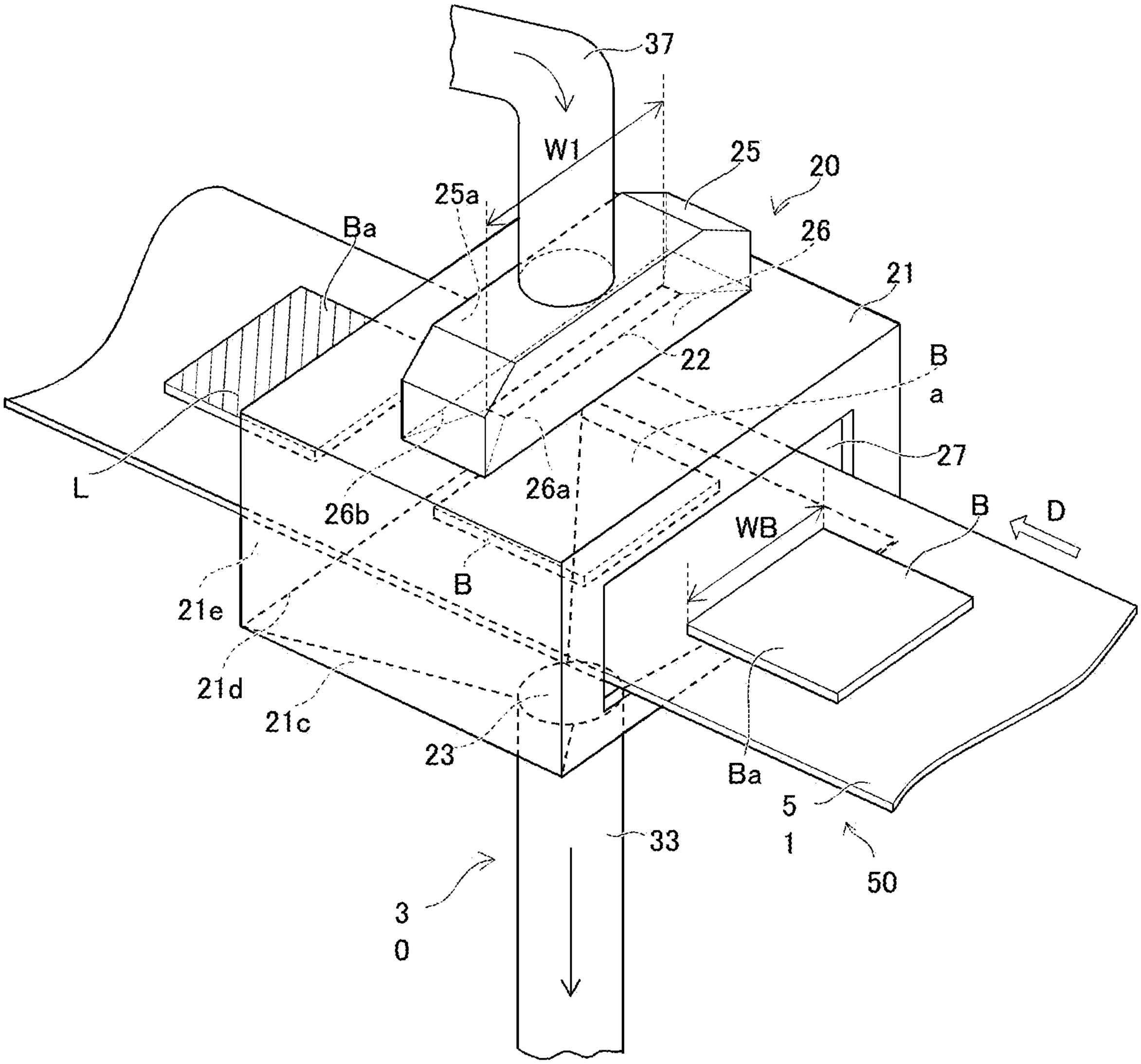
FIG. 2 is a perspective view of a main part of the substrate surface treatment device of FIG. 1.

Hereinafter, a surface treatment method for the substrate B using the surface treatment device 100A will be described. As shown in FIG. 1 and FIG. 2, in the present embodiment, the surface treatment method for the substrate B performs surface treatment on the substrate B by causing the treatment liquid L to adhere to the treatment surface Ba of the substrate B.

First, the substrate B is placed on the conveyor belt 51 of the conveying device 50. By driving the conveying device 50, the substrate B is conveyed into the treatment chamber 20 with the treatment surface Ba of the substrate B facing up. In the present embodiment, using the mist generator 10 having the treatment liquid L stored therein, the mist M generated from the treatment liquid L is introduced into the treatment chamber 20, where the substrate B is placed, from the upper part of the treatment chamber 20.

Here, as described above, the mist generator 10 may introduce the mist M having a particle size adjusted in the range of 10 to 80 μm into the treatment chamber 20. Further, the mist M supplied to the treatment chamber 20 may have a concentration of 5 to 80% by volume. When the mist M has a concentration of less than 5% by volume, it may take a long time to cause the mist M to adhere to the treatment surface Ba of the substrate B. In contrast, when the mist M has a concentration of greater than 80% by volume, the mist M is more likely to coagulate.

The concentration of the mist M can be adjusted by setting the amount of mist generated by the mist generator 10 per unit time and the carrier gas flow rate of the flow regulating valve 42. The concentration of the mist M is a total volume of the mist M (volume of the treatment liquid L) present per unit volume. For example, the concentration of the mist M may be calculated from the proportion of the total volume of the mist M (volume of the treatment liquid L) present in the body 21 with respect to the internal volume of the body 21.

As described above, the mist M is caused to adhere to the treatment surface Ba of the substrate B in the treatment chamber 20. Note that when the treatment liquid is water, according to the experiments conducted by the inventors, the amount of the mist M (treatment liquid L) adhering to the treatment surface Ba of the substrate B may be in the range of 0.8 to 420 $\mu L/cm^2$ per unit area. The amount of the mist M adhering may be adjusted by adjusting the conveying speed of the substrate B and setting a time the substrate B stays in the treatment chamber 20. Note that when the amount of the mist M adhering is less than 0.8 $\mu l/cm^2$, a uniform liquid membrane of the treatment liquid L may not be formed on the treatment surface Ba of the substrate B, and even when the amount of the mist M adhering is greater than 420 $\mu L/cm^2$, the liquid membrane of the treatment liquid L cannot be held on the treatment surface Ba of the substrate B due to the surface tension of the substrate B.

Meanwhile, using the circulation path 30, the mist M is discharged from the lower part of the treatment chamber 20, and the discharged mist M is circulated to the treatment chamber 20 together with the generated mist M. In the present embodiment, the mist M is introduced into the upper part of the treatment chamber 20, and the mist M is discharged from the lower part of the treatment chamber 20. Inside of the treatment chamber 20, the mist M adheres to the inner wall surface 21*e* and bottom wall surface 21*c* of the body 21 of the treatment chamber 20, and the coagulated mist M becomes the treatment liquid L and flows toward the discharge port 23.

More specifically, the treatment liquid L flowing down from the discharge port 23 of the treatment chamber 20 is collected in the container 14 through the discharge pipe 33. From the collected treatment liquid L, the mist M is generated in the space 12 that forms part of the circulation path 30. The discharged mist M, together with the generated mist M, is circulated to the treatment chamber 20.

At this time, the carrier gas G is supplied to the circulation path 30 from the gas path 41 connected to the circulation path 30. This allows the mist M in the circulation path 30 to be introduced into the treatment chamber 20 while being carried by the carrier gas G. Specifically, by adjusting the flow rate of the carrier gas flowing in the gas path 41 by the flow regulating valve 42, the mist M at a desired concentration can be stably introduced into the treatment chamber 20. The mist M from the upper part of the treatment chamber 20 is allowed to efficiently adhere to the treatment surface of the substrate B directed upward. The mist M not adhering to the treatment surface Ba of the substrate B is discharged from the lower part of the treatment chamber 20 and is allowed to be circulated together with the generated mist M.

As described above, the mist M generated from the treatment liquid L is introduced into the treatment chamber 20. The introduced mist M adheres to the treatment surface Ba of the substrate B in the treatment chamber 20, whereby the surface treatment of the substrate B is performed. Meanwhile, a part of the mist M not adhering to the treatment surface Ba of the substrate B is discharged from the treatment chamber 20, and the discharged mist M, together with the generated mist M, is circulated to the treatment chamber 20 and can be introduced again into the treatment chamber 20. In this way, since the generated mist M is circulated to the treatment chamber 20 and reused, surface treatment can be performed on the treatment surface Ba of the substrate B at low cost.

In addition, the treatment liquid L resulting from the coagulation of the mist M in the treatment chamber 20 flows down the wall surface of the treatment chamber 20 and is discharged from the discharge port 23 in the lower part of the treatment chamber 20. The discharged treatment liquid L is collected in the container 14. The mist M can be generated again from the collected treatment liquid L and reused together with the mist M discharged from the treatment chamber 20.

Second Embodiment

Figure 3:
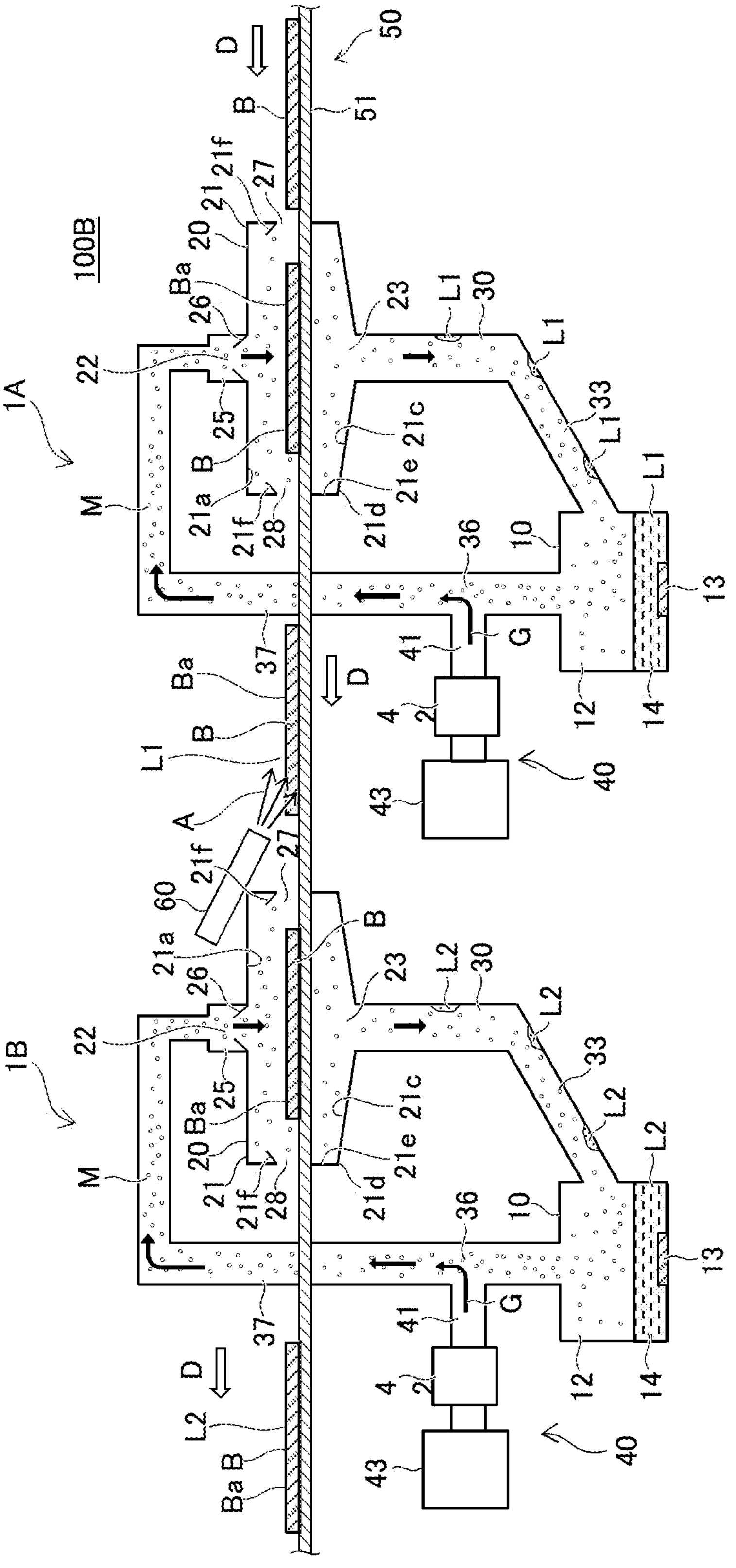
FIG. 3 is a schematic cross-sectional view for describing a substrate surface treatment device according to a second embodiment.

Hereinafter, referring to FIG. 3 and FIG. 4, a surface treatment device 100B for the substrate B according to a second embodiment will be described. The following mainly describes how the present embodiment differs from the first embodiment. Note that the same reference numeral is given to a member and component having the same function or the like, and detailed description thereof will be omitted.

In the present embodiment, the surface treatment device 100B includes a plurality of (specifically, two) treatment units 1A, 1B disposed along the conveying direction D of the conveying device 50. The treatment chambers 20, 20 of the treatment units 1A, 1B are disposed along the conveying direction D. Each of the treatment units 1A, 1B serves as a unit comprising at least the mist generator 10, the treatment chamber 20, and the circulation path 30. Note that although the two treatment units 1A, 1B are disposed along the conveying direction D in the present embodiment, the surface treatment device 100B may include three or more treatment units disposed along the conveying direction D.

The conveyor belt 51 of the conveying device 50 is disposed so as to be inserted through the treatment chamber 20 of each treatment unit 1A (1B). This allows the substrate B to sequentially pass through the treatment units 1A, 1B while conveying the substrate B by the conveying device 50, and thus surface treatment can be continuously performed on the treatment surface Ba of the substrate B in the treatment units 1A, 1B.

The mist generator 10 of the treatment unit 1A generates a mist of a treatment liquid L1. The mist generator 10 of the treatment unit 1B generates a mist of a treatment liquid L2 that is different from the treatment liquid L1. This allows the substrate B to pass through the treatment unit 1A and the treatment unit 1B in this order while conveying the substrate B, whereby different types of surface treatment can be performed on the treatment surface Ba of the substrate B using the treatment liquids L1, L2.

Furthermore, an air nozzle 60 for draining the treatment liquid L derived from the mist M adhering to the treatment surface Ba of the substrate B is disposed between the adjacent treatment chambers 20, 20 of the treatment units 1A, 1B. Accordingly, even when surface treatment is performed in the treatment unit 1B on the downstream side in the conveying direction D with the treatment liquid L2 (mist) that is different from the treatment liquid L1 on the upstream side, it is possible to reduce the influence of the treatment liquid L1 adhered in the treatment unit 1A on the upstream side. Note that an air nozzle may further be disposed on the downstream side of the treatment chamber 20 of the treatment unit 1B.

Figure 4:
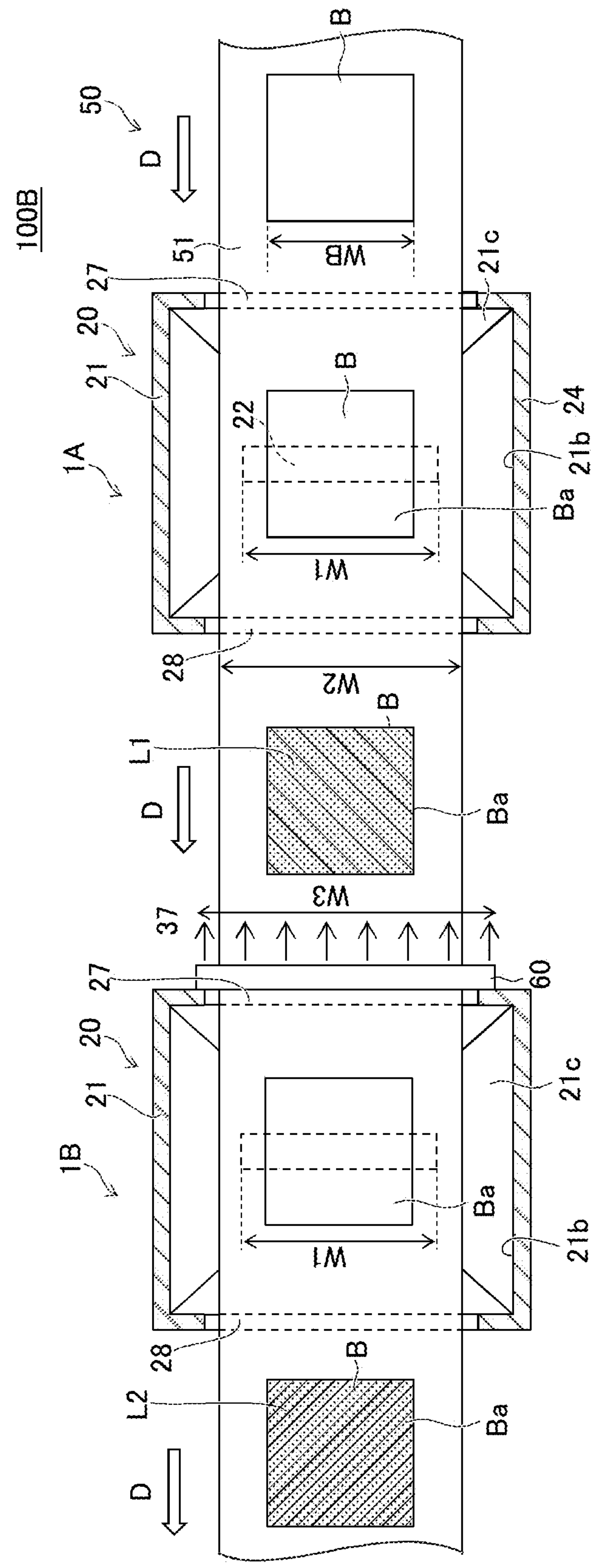
FIG. 4 is a perspective view of a main part of the substrate surface treatment device according to the second embodiment in a plan view.

Here, as shown in FIG. 4, the introduction port 22 has a width W1 that is wider than the width WB of the substrate B. This allows the mist M (the mist M of the treatment liquids L1, L2) introduced into the introduction port 22 to uniformly adhere to the treatment surface Ba of the substrate B. Furthermore, a width W3 of an air A sprayed by the air nozzle 60 is wider than W2 of the conveyor belt 51. This allows the mist M (treatment liquid L1) adhering to the conveyor belt 51 to be removed by the air A from the air nozzle 60. Note that the conveyor belt 51 may be inclined with respect to the horizontal direction such that the conveyor belt 51 is lowered on the upstream side in the conveying direction D. This can increase the draining performance by the air A from the air nozzle 60.

EXAMPLES

Examples of the present disclosure will be described below.

Example 1

On the treatment surface of the substrate made of Hull Cell copper, which is 100 mm×100 mm in size and 0.3 mm in thickness, about 2 mL of a Ni plating solution was dropped. The dropped Ni plating solution was spread on the entire treatment surface of the substrate and the unnecessary plating solution was removed. About 0.5 mm of the plating solution was present on the treatment surface of the substrate.

Next, using the surface treatment device shown in FIG. 1, the mist M as water (treatment liquid L) was caused to adhere to the substrate B while conveyed by the conveyor belt at a conveying speed of 1000 mm per minute, and then the substrate B was air blown by the air nozzle.

The series of the above surface treatment steps was performed as a cleaning process. The cleaning process was repeated and every time each cleaning process completed, the amount of Ni adhering to the surface of the substrate was measured by the ICP-MS analysis. The cleaning process was ended at the point when the surface of the substrate reached a state (the amount of Ni adhering was 3 μg) similar to that before each cleaning process. Table 1 below shows the number of cleaning processes (cleaning count) and the rate of water usage. Note that the rate of water usage in the following Example 2, Comparative Example 1, and Comparative Example 2 shows a rate when the water usage in Example 1 is 1.0.

Example 2

Surface treatment (cleaning) similar to that in Example 1 was performed. Example 2 differs from Example 1 in that the conveying speed of the conveyor belt was 500 mm per minute. The number of cleaning processes (cleaning count) and the rate of water usage are shown in Table 1 below.

Comparative Example 1

Like Example 1, the Ni plating solution was spread on the surface of the substrate, and then the substrate was immersed in an immersion cleaning device to clean the substrate. The rate of water usage is shown in Table 1 below.

Comparative Example 2

Like Example 1, the Ni plating solution was spread on the surface of the substrate, and then the substrate was cleaned by shower washing. The rate of water usage is shown in Table 1 below.

TABLE 1

| | Cleaning method | Cleaning count | Rate of water usage |
|---|---|---|---|
| Example 1 | Mist | 11 | 1.0 |
| Example 2 | Mist | 9 | 1.2 |
| Comparative Example 1 | Immersion | — | 515.6 |
| Comparative Example 2 | Shower | — | 68.9 |

It was found that when the surface treatment device of Examples 1 and 2 was used, the water usage was significantly reduced as compared to Comparative Examples 1, 2.

Although the embodiments of the present disclosure have been described in detail above, the present disclosure is not limited to the above embodiments, and various design changes are possible in so far as they are within the spirit of the present disclosure in the scope of the claims.

For example, the air nozzle shown in the second embodiment may be disposed downstream of the outlet of the treatment chamber shown in the first embodiment to perform draining of the treatment liquid adhering to the surface of the substrate. Further, the above-described air nozzles may be disposed at the inlet and the outlet of the treatment chamber, and the conveyor belt may be reciprocated in the conveying direction to pass the substrate through the treatment chamber. This can repeat the series of steps of allowing the treatment liquid (mist) to adhere to the treatment surface of the substrate in the treatment chamber and draining the treatment liquid (mist) adhering to the treatment surface of the substrate conveyed out of the treatment chamber.

What is claimed is:

1. A substrate surface treatment device for surface treatment of a substrate by causing a treatment liquid to adhere to a treatment surface of the substrate, comprising:

a mist generator configured to generate a mist of the treatment liquid;

a treatment chamber configured to introduce the mist generated by the mist generator and cause the introduced mist to adhere to the treatment surface of the substrate; and a circulation path configured to circulate the mist discharged from the treatment chamber to the treatment chamber together with the mist generated by the mist generator;

wherein the treatment chamber comprises a body and a mist containing chamber formed on an upper part of the body, the body and the mist containing chamber separated by a partition plate comprising an introduction port that is connected to the circulation path by the mist containing chamber; and wherein the partition plate is inclined downward from the introduction port toward a peripheral edge of the partition plate.

2. The substrate surface treatment device according to claim 1, wherein the mist generator is disposed in the circulation path, wherein the mist generator includes a container that collects the treatment liquid derived from the mist from the treatment chamber and stores the treatment liquid, and wherein the mist generator generates the mist from the treatment liquid stored in the container.

3. The substrate surface treatment device according to claim 2, wherein the circulation path is connected to the treatment chamber such that the mist is introduced into an upper part of the treatment chamber and the mist is discharged from a lower part of the treatment chamber, and wherein the container is disposed in a lower part of the circulation path.

4. The substrate surface treatment device according to claim 1, wherein the circulation path is connected to a gas path for a carrier gas that carries the mist to the treatment chamber.

5. The substrate surface treatment device according to claim 1, further comprising a conveyor configured to convey the substrate in and out of the treatment chamber with the treatment surface of the substrate directed upward, wherein the circulation path is connected to the treatment chamber such that the mist is introduced into an upper part of the treatment chamber and the mist is discharged from a lower part of the treatment chamber.

6. The substrate surface treatment device according to claim 5, wherein a plurality of treatment units are disposed along a conveying direction of the conveyor, each serving as a unit comprising at least the mist generator, the treatment chamber, and the circulation path.

7. The substrate surface treatment device according to claim 6, wherein an air nozzle for draining a treatment liquid derived from the mist adhering to the treatment surface of the substrate is disposed between adjacent treatment chambers of the treatment units.

8. The substrate surface treatment device according to claim 1, wherein the introduction port has a rectangular shape.

9. The substrate surface treatment device according to claim 1, wherein the body further comprises a discharge port formed in a lower portion of the body, and a bottom wall surface that is inclined downward from a peripheral edge of the bottom wall surface to the discharge port.

10. A substrate surface treatment method for surface treatment of a substrate by causing a treatment liquid to adhere to a treatment surface of the substrate, comprising:

providing the substrate surface treatment device according to claim 1;

introducing a mist generated from the treatment liquid into the treatment chamber where the substrate is placed;

causing the mist to adhere to the treatment surface of the substrate;

discharging the mist from the treatment chamber; and circulating the discharged mist to the treatment chamber together with the generated mist.

11. The substrate surface treatment method according to claim 10, wherein a treatment liquid derived from the mist is collected from the treatment chamber; the mist is generated from the collected treatment liquid; and the discharged mist is circulated to the treatment chamber together with the generated mist.

12. The substrate surface treatment method according to claim 11, wherein the mist is introduced into an upper part of the treatment chamber; the mist is discharged from a lower part of the treatment chamber; the treatment liquid flowing down from the treatment chamber is collected; and the mist is generated from the collected treatment liquid.

13. The substrate surface treatment method according to claim 10, wherein the mist is introduced into the treatment chamber while carrying the mist using a carrier gas.

14. The substrate surface treatment method according to claim 10, wherein the substrate is conveyed in and out of the treatment chamber with the treatment surface of the substrate directed upward, and wherein the mist is introduced into an upper part of the treatment chamber and the mist is discharged from a lower part of the treatment chamber.

15. The substrate surface treatment method according to claim 14, wherein the treatment chamber includes a plurality of treatment chambers disposed along a conveying direction of the substrate, and wherein in each of the plurality of treatment chambers, the mist is caused to adhere to the treatment surface of the substrate.

16. The substrate surface treatment method according to claim 15, wherein draining of a treatment liquid derived from the mist adhering to the treatment surface of the substrate is performed between adjacent treatment chambers.

* * * * *